United States Patent Office 2,873,264
Patented Feb. 10, 1959

2,873,264

VINYL AROMATIC POLYMERS STABILIZED WITH DIMETHYLALKYLENE DIAMINES

William K. Schweitzer, Jr., Midland, Mich., assignor to The Dow Chemical Company, Midland, Mich., a corporation of Delaware No Drawing. Application July 2, 1956
Serial No. 595,065

5 Claims. (Cl. 260—45.9)

This invention concerns compositions of matter consisting essentially of polymerized monovinyl aromatic hydrocarbons and certain dimethylalkylene diamines as stabilizing agents for inhibiting the polymer against the discoloring and embrittling effects of exposure to light, out-of-doors weathering or heat.

Polystyrene is known to undergo undesirable physical changes upon prolonged exposure to light, heat or out-of-doors weathering. The observable symptoms of such changes are discoloration or embrittlement, or both, due in varying measure to the action of heat or light with resulting deterioration of the mechanical properties or appearance of the polystyrene. These characteristics are shared to more or less extent by other vinyl aromatic polymers such as polymers of any one or more monovinyl aromatic hydrocarbons of the benzene series, e. g. vinyltoluene, vinylxylene, ethylvinylbenzene, isopropyl styrene, ethylvinyltoluene, tert.-butylstyrene or diethylvinylbenzene, or copolymers of such vinyl aromatic hydrocarbons and styrene.

Since the uses of vinyl aromatic polymers include the manufacture of molded articles and thin films, either embrittlement or discoloration of the polymer is to be avoided. The provisions of stabilized compositions of vinyl aromatic polymers is the principal object of the invention.

According to the invention, the foregoing object is attained by mixing, preferably intimately incorporating, with a thermoplastic vinyl aromatic polymer, e. g. polystyrene, from 0.5 to 5, preferably from 1 to 3 percent by weight of at least one N,N-dimethylalkylene diamine having the general formula:

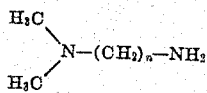

wherein $n$ is an integer from 2 to 5. Articles made from the resulting compositions show little or no tendency to discolor upon prolonged exposure to light, e. g. sunlight or light rich in ultraviolet rays, and exhibit little tendency to become brittle as a result of such exposure.

Examples of suitable N,N-dimethylalkylene diamines are N,N-dimethylethylene diamine, N,N-dimethylpropylene diamine, N,N-dimethylbutylene diamine and N,N-dimethylamylene diamine. Mixtures of any two or more of such amines can also be used.

Peculiarly, it has been found that higher alkyl-substituted alkylene diamines, e. g. N,N-diethylethylene diamine or N,N-diethylpropylene diamine, have far less stabilizing action for preventing discoloration of vinyl aromatic polymers such as polystyrene upon prolonged exposure to light, than have the N,N-dimethylalkylene diamines employed in the invention.

The N,N-dimethylalkylene diamines can be incorporated with the vinyl aromatic polymers in any of several ways. The normally solid thermoplastic vinyl aromatic polymer can be heat-plastified on compounding rolls, a Banbury mixer or in a plastics extruder and the dimethylalkylene diamine intimately mixed or blended therewith, or the polymer and the stabilizing agent can be dissolved in a common solvent and the latter evaporated to recover the polymeric product.

In practice the polymer, e. g. polystyrene, is preferably heat-plastified on compounding rolls, a Banbury mixer or a plastics extruder and the dimethylalkylene diamine intimately incorporated with the heat-plastified polymer in the desired amount to obtain a uniform composition. The composition is usually cooled and cut or ground to a granular form suitable for molding.

Small amounts of additives such as dyes, colors, pigments, plasticizers, flow agents, lubricants, etc., may also be incorporated with the composition, but such additives are not required. The additives, when used, are usually employed in amounts of from 0.5 to 10 percent by weight of the polymer.

The following example illustrates ways in which the principle of the invention has been applied, but is not to be construed as limiting its scope.

EXAMPLE

In each of a series of experiments, 0.5 percent by weight of an N,N-dimethylalkylene diamine as identified in the following table was blended with granular polystyrene by tumbling in a laboratory blender. The mixture was fed to a laboratory extruder wherein it was heat-plastified and mechanically blended into a uniform composition, then extruded, cooled and crushed to a granular form. Portions of the composition were injection molded to form test pieces having the dimensions 2 x 2½ inches by 0.1 inch thick. The test pieces were used to determine a color value for the composition as initially prepared. The procedure for determining the color value was to measure the amount of light of wave lengths between 420 and 620 millimicrons transmitted through a test piece of the composition. The difference between the percent of transmitted light having a wave length of 620 millimicrons and the percent of transmitted light having a wave length of 420 millimicrons represents a measure of the color of the composition. The test pieces were exposed to out-of-doors weathering in the State of Florida, U. S. A., at about latitude 25° north by placing the test pieces on a rack facing south and inclined at an angle of 45° above horizontal and subjecting the test pieces to weathering for a period of three months between about February 15, 1954, and May 15, 1954. Thereafter, the test pieces were removed and a color value determined as previously described. The difference between the color value after exposure to weathering and the color value of the composition as initially prepared is a measure of the discoloration of the polystyrene upon weathering. The greater the difference in color value the greater is the discoloration. Conversely, the smaller the difference in color value the greater is the stabilizing or inhibiting action of the added agent for preventing discoloration of the polymer. For purpose of comparison, test pieces of the polystyrene without a stabilizing agent were prepared and tested under similar conditions. The table identifies the amine stabilizing agent and gives the color change for the composition.

Table

| Run No. | Added Agent | | Initial Color | Final Color | Color Change |
|---|---|---|---|---|---|
| | Kind | Percent | | | |
| 1 | None | 0.0 | 1.7 | 18.2 | 16.5 |
| 2 | N,N-dimethylethylene-diamine | 0.5 | 8.0 | 9.7 | 1.7 |
| 3 | N,N-dimethylpropylene-diamine | 0.5 | 7.9 | 11.7 | 3.3 |
| 4 | ----do---- | 1.0 | 8.6 | 14.4 | 5.8 |
| 5 | ----do---- | 1.5 | 8.8 | 16.4 | 7.6 |
| 6 | ----do---- | 2.0 | 8.2 | 16.2 | 8.0 |

I claim:

1. A composition of matter consisting essentially of a polymerized monovinyl aromatic hydrocarbon of the benzene series and, as a stabilizing agent therefor, from 0.5 to 5 percent, based on the weight of the polymer, of at least one N,N-dimethylalkylene diamine having the general formula:

$$\begin{array}{c} H_3C \\ \phantom{H_3C}\diagdown \\ \phantom{H_3C}\phantom{\diagdown}N-(CH_2)_n-NH_2 \\ \phantom{H_3C}\diagup \\ H_3C \end{array}$$

wherein $n$ is an integer from 2 to 5.

2. A composition as claimed in claim 1, wherein the diamine is N,N-dimethylethylene diamine.

3. A composition as claimed in claim 2, wherein the polymeric body is polystyrene.

4. A composition as claimed in claim 1, wherein the diamine is N,N-dimethylpropylene diamine.

5. A composition as claimed in claim 4, wherein the polymeric body is polystyrene.

References Cited in the file of this patent

UNITED STATES PATENTS

| 2,287,188 | Matheson et al. | June 23, 1942 |
| 2,729,691 | De Pree | Jan. 3, 1956 |